US012484472B2

(12) United States Patent
Thompson et al.

(10) Patent No.: US 12,484,472 B2
(45) Date of Patent: Dec. 2, 2025

(54) PENETRATION DEPTH CONTROL AND GAUGE WHEEL CONTACT FORCE MONITORING SYSTEM FOR AN AGRICULTURAL ROW UNIT

(71) Applicant: CNH Industrial Canada, Ltd., Saskatoon (CA)

(72) Inventors: Dennis George Thompson, Eagle Ridge (CA); Trevor Lawrence Kowalchuk, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 1014 days.

(21) Appl. No.: 17/560,885

(22) Filed: Dec. 23, 2021

(65) Prior Publication Data

US 2023/0200278 A1 Jun. 29, 2023

(51) Int. Cl.
*A01C 5/06* (2006.01)
*A01C 7/20* (2006.01)
(Continued)

(52) U.S. Cl.
CPC .............. *A01C 7/205* (2013.01); *A01C 5/064* (2013.01); *A01C 7/203* (2013.01); *A01B 15/16* (2013.01); *A01C 7/08* (2013.01)

(58) Field of Classification Search
CPC ........... A01C 7/203; A01C 7/205; A01C 7/08; A01C 5/064; A01C 5/06; A01C 7/20; A01B 15/16
See application file for complete search history.

(56) References Cited

U.S. PATENT DOCUMENTS 6,085,846 A 7/2000 Buchl et al.
6,164,385 A 12/2000 Buchl
(Continued)

FOREIGN PATENT DOCUMENTS

CA           3160734 A1 * 1/2023 ........... A01B 63/008
WO     WO-2021080496 A1 * 4/2021 ........... A01B 63/008

OTHER PUBLICATIONS

Precision Planting, SeederForce, Automated Seeder DownForce Control, https://www.precisionplanting.com/products/product/seederforce, retrieved Jun. 21, 2019, 8 pgs.
(Continued)

*Primary Examiner* — Adam J Behrens
(74) *Attorney, Agent, or Firm* — Fletcher Yoder, P.C.

(57) ABSTRACT

A penetration depth control and gauge wheel contact force monitoring system for a row unit includes a penetration depth actuator configured to drive a gauge wheel arm assembly to move a gauge wheel relative to a row unit frame to control a penetration depth of an opener of the row unit. The penetration depth actuator includes a contact force sensor configured to output a sensor signal indicative of a contact force between the gauge wheel and a soil surface, the penetration depth actuator includes a body configured to be coupled to one of the frame or the gauge wheel arm assembly, the penetration depth actuator includes an actuating device configured to be coupled to the other of the frame or the gauge wheel arm assembly, and the actuating device is configured to move relative to the body to drive the gauge wheel arm assembly to move the gauge wheel.

20 Claims, 4 Drawing Sheets

(51) Int. Cl.
*A01B 15/16* (2006.01)
*A01C 7/08* (2006.01)

(56) References Cited

U.S. PATENT DOCUMENTS

| | | | |
|---|---|---|---|
| 6,389,999 | B1 | 5/2002 | Duello |
| 6,701,857 | B1* | 3/2004 | Jensen .................. A01C 7/006 |
| | | | 111/900 |
| 8,522,889 | B2 | 9/2013 | Adams et al. |
| 8,634,992 | B2 | 1/2014 | Sauder et al. |
| 8,910,582 | B2 | 12/2014 | Mariman et al. |
| 9,107,338 | B2 | 8/2015 | Bassett |
| 9,173,339 | B2 | 11/2015 | Sauder et al. |
| 9,554,504 | B2 | 1/2017 | Houck |
| 9,814,172 | B2 | 11/2017 | Achen et al. |
| 9,826,677 | B2* | 11/2017 | Gervais .................. A01C 7/205 |
| 9,883,626 | B2 | 2/2018 | Heim et al. |
| 9,943,029 | B2 | 4/2018 | Burk et al. |
| 9,968,030 | B2* | 5/2018 | Kowalchuk ........... A01C 7/205 |
| 10,080,323 | B2 | 9/2018 | Lund et al. |
| 10,149,424 | B2 | 12/2018 | Maust et al. |
| 10,238,023 | B2* | 3/2019 | Sauder .................. A01B 63/114 |
| 10,327,374 | B2* | 6/2019 | Achen .................... A01B 71/02 |
| 11,246,254 | B1* | 2/2022 | Schulte .................... F15B 9/03 |
| 2012/0048160 | A1* | 3/2012 | Adams .................. A01C 5/066 |
| | | | 111/163 |
| 2012/0255475 | A1* | 10/2012 | Mariman ............... A01C 5/066 |
| | | | 111/149 |
| 2015/0296698 | A1 | 10/2015 | Schumacher et al. |
| 2017/0094889 | A1* | 4/2017 | Garner ................... A01C 7/206 |
| 2017/0142897 | A1 | 5/2017 | Hagny et al. |
| 2017/0238458 | A1* | 8/2017 | Achen .................... A01C 5/064 |
| 2017/0367251 | A1* | 12/2017 | Hamilton ............... A01C 7/203 |
| 2018/0042171 | A1* | 2/2018 | Maro ...................... A01C 7/205 |
| 2018/0054953 | A1 | 3/2018 | Martin |
| 2018/0128933 | A1 | 5/2018 | Koch et al. |
| 2018/0168094 | A1 | 6/2018 | Koch et al. |
| 2019/0110388 | A1* | 4/2019 | Gresch .................... A01C 7/20 |
| 2019/0110392 | A1 | 4/2019 | Gresch et al. |
| 2019/0124824 | A1 | 5/2019 | Hubner et al. |
| 2019/0183036 | A1 | 6/2019 | Leimkuehler et al. |
| 2020/0045869 | A1* | 2/2020 | Stanhope ............... A01C 7/205 |
| 2020/0396889 | A1 | 12/2020 | Kowalchuk |
| 2020/0404831 | A1 | 12/2020 | Kowalchuk et al. |
| 2020/0404837 | A1 | 12/2020 | Thompson et al. |
| 2021/0003470 | A1* | 1/2021 | Schoeny ............... A01B 79/005 |
| 2024/0040958 | A1* | 2/2024 | Litwiller ................ A01C 7/205 |

OTHER PUBLICATIONS

Precision Planting, DeltaForce, Automated Downforce Control That Has Been Proven on Hundreds of Thousands of Rows, https://www.precisionplanting.com/products/product/deltaforce, retrieved Jun. 21, 2019, 8 pgs.

John Deere Introduces New Air Hoe Seeder, American Cattlemen, https://www.americancattlemen.com/articles/john-deere-introduces-new-air-hoe-seeder, Jul. 5, 2016, 3 pgs.

Scroggins, "LDTs Monitor Tillage Depth Through Cylinder," Hydraulics & Pneumatics, May 29, 2019, 11 pgs.

U.S. Appl. No. 17/360,688, filed Jun. 28, 2021, Trevor Lawrence Kowalchuk.

U.S. Appl. No. 17/360,325, filed Jun. 28, 2021, Trevor Lawrence Kowalchuk.

Sharda et al., "Planter Downforce Technology for Uniform Seeding Depth, Static Downforce System", Kansas State University Agricultural Experiment Station and Cooperative Extension Service, MR3331, Mar. 2017, 8 pgs.

* cited by examiner

PENETRATION DEPTH CONTROL AND GAUGE WHEEL CONTACT FORCE MONITORING SYSTEM FOR AN AGRICULTURAL ROW UNIT

BACKGROUND

The present disclosure relates generally to a penetration depth control and gauge wheel contact force monitoring system for an agricultural row unit.

Generally, seeding implements (e.g., seeders) are towed behind a tractor or other work vehicle via a mounting bracket secured to a rigid frame of the implement. Seeding implements typically include multiple row units distributed across a width of the implement. Each row unit is configured to deposit seeds at a target depth beneath the soil surface of a field, thereby establishing rows of planted seeds. For example, each row unit typically includes a ground engaging tool or opener that forms a seeding path (e.g., trench) for seed deposition into the soil. A seed tube (e.g., positioned adjacent to the opener) is configured to deposit seeds into the trench. The opener/seed tube may be followed by a packer wheel that packs the soil on top of the deposited seeds.

Certain row units include a gauge wheel configured to control a penetration depth of the opener (e.g., opener disc) into the soil. For example, the row unit may include a depth adjustment handle configured to adjust a vertical position of the gauge wheel relative to a frame of the row unit. Because the opener is non-movably coupled to the frame and the gauge wheel is configured to contact the surface of the soil during operation of the row unit, controlling the vertical position of the gauge wheel adjusts the penetration depth of the opener into the soil.

Furthermore, the force applied by the opener (e.g., opener disc) to the soil may be adjusted based on soil conditions, soil type, and/or seed type, among other factors. Accordingly, the implement may include a downforce actuator configured to adjust the force applied by the opener to the soil. In certain implements, the downforce actuator is manually controlled. Unfortunately, manually controlling the downforce actuator may cause the downforce actuator to apply a force that is higher or lower than a desired force (e.g., due to changing soil conditions throughout the field). If the force applied by the downforce actuator is higher than desired, the soil may be undesirably compacted by the gauge wheel. In addition, if the force applied by the downforce actuator is lower than desired, the gauge wheel may not contact the soil surface, thereby undesirably reducing the penetration depth of the opener (e.g., opener disc).

BRIEF DESCRIPTION

In certain embodiments, a penetration depth control and gauge wheel contact force monitoring system for an agricultural row unit includes a penetration depth actuator configured to drive a gauge wheel arm assembly to move a gauge wheel relative to a frame of the agricultural row unit to control a penetration depth of an opener of the agricultural row unit. The penetration depth actuator includes a contact force sensor configured to output a sensor signal indicative of a contact force between the gauge wheel and a soil surface, the penetration depth actuator includes a body configured to be coupled to one of the frame or the gauge wheel arm assembly, the penetration depth actuator includes an actuating device configured to be coupled to the other of the frame or the gauge wheel arm assembly, the actuating device is configured to move relative to the body to drive the gauge wheel arm assembly to move the gauge wheel, the penetration depth actuator includes a first connector coupled to the body and configured to couple to an actuating line, and the penetration depth actuator includes a second connector coupled to the body and configured to communicatively couple a sensor line to the contact force sensor.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
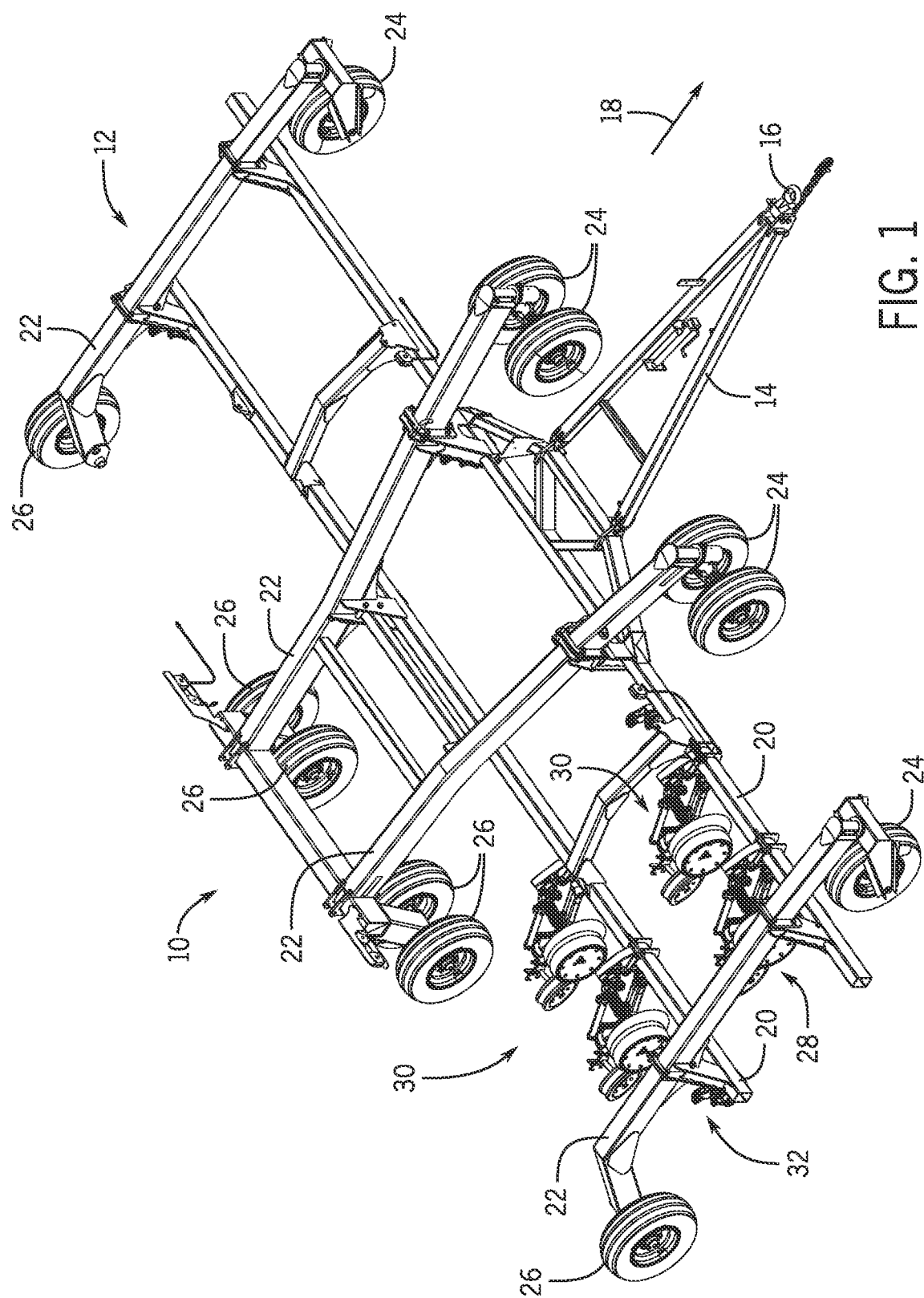
FIG. 1 is a perspective view of an embodiment of an agricultural implement having multiple row units.

FIG. 1 is a perspective view of an embodiment of an agricultural implement 10 having multiple row units. As illustrated, the agricultural implement 10 includes a frame 12 and a tow bar 14 coupled to the frame 12. In the illustrated embodiment, the tow bar 14 is pivotally coupled to the frame 12 and includes a hitch 16. The hitch 16 is configured to interface with a corresponding hitch of a work vehicle (e.g., tractor, etc.), thereby enabling the work vehicle to tow the agricultural implement 10 through a field along a direction of travel 18. While the illustrated tow bar 14 forms an A-frame, in certain embodiments, the tow bar may have any other suitable configuration (e.g., a single bar extending along the direction of travel, etc.). In addition, while the tow bar 14 is pivotally coupled to the frame 12 in the illustrated embodiment, in certain embodiments, the tow bar may be rigidly coupled to the frame. Furthermore, in certain embodiments, the hitch 16 may be coupled to a corresponding hitch of another implement (e.g., an air cart, etc.), and the other implement may be coupled to the work vehicle (e.g., via respective hitches). While the agricultural implement 10 is configured to be towed through the field by a work vehicle in the illustrated embodiment, in certain embodiments, the agricultural implement may be part of a self-propelled vehicle (e.g., in which the frame of the agricultural implement is coupled to a main frame/chassis of the self-propelled vehicle).

In the illustrated embodiment, the frame 12 of the agricultural implement 10 includes two toolbars 20 and four supports 22. As illustrated, wheels are coupled to the supports 22, and the supports 22 are coupled to the toolbars 20 (e.g., via fasteners, via a welded connection, etc.). In the illustrated embodiment, front wheel(s) 24 are rotatably coupled to a respective front portion of each support 22, and rear wheel(s) 26 are rotatably coupled to a respective rear portion of each support 22. The front portion of each support 22 is positioned forward of the respective rear portion relative to the direction of travel 18. The wheels maintain the supports 22 above the surface of the field and enable the agricultural implement 10 to move along the direction of travel 18. In the illustrated embodiment, pivotal connections between the front wheels 24 and the respective supports 22 enable the front wheels 24 to caster, thereby enhancing the turning ability of the agricultural implement 10 (e.g., at a headland, during transport, etc.). However, in certain embodiments, at least one front wheel may be non-pivotally coupled to the respective support, and/or at least one rear wheel may be pivotally coupled to the respective support. While the frame 12 of the agricultural implement 10 has four supports 22 in the illustrated embodiment, in certain embodiments, the agricultural implement may have more or fewer supports (e.g., 0, 1, 2, 3, 5, 6, or more). Furthermore, in certain embodiments, the toolbars 20 of the frame 12 may be supported by other and/or additional suitable structure(s) (e.g., connector(s) extending between toolbars, wheel mounts coupled to toolbars, etc.).

In the illustrated embodiment, a first row 28 of row units 30 is coupled to the front toolbar 20, and a second row 32 of row units 30 is coupled to the rear toolbar 20. While the agricultural implement 10 has two toolbars 20 and two corresponding rows of row units 30 in the illustrated embodiment, in other embodiments, the agricultural implement may include more or fewer toolbars (e.g., 1, 3, 4, 5, 6, or more) and a corresponding number of rows of row units. Furthermore, while the agricultural implement 10 includes one type of row unit in the illustrated embodiment, in other embodiments, the agricultural implement may include multiple types of row units and/or other suitable agricultural tool(s) (e.g., spray nozzle(s), finishing reel(s), tillage shank(s), etc.).

In the illustrated embodiment, each row unit 30 of the agricultural implement 10 is configured to deposit agricultural product (e.g., seed, fertilizer, etc.) into the soil. For example, certain row units 30 (e.g., all of the row units 30 of the agricultural implement 10, a portion of the row units 30 of the agricultural implement 10, at least one row unit 30 of the agricultural implement 10, etc.) include an opener (e.g., opener disc) configured to form a trench within the soil for agricultural product deposition into the soil. The row unit 30 also includes a gauge wheel (e.g., positioned adjacent to the opener) configured to control a penetration depth of the opener into the soil. For example, the opener may be non-movably coupled to a frame of the row unit, and the gauge wheel may be movably coupled to the frame and configured to contact a surface of the soil during operation of the row unit. Accordingly, adjusting the vertical position of the gauge wheel relative to the frame of the row unit controls the penetration depth of the opener into the soil. In addition, the row unit includes a product tube (e.g., seed tube) configured to deposit the agricultural product into the trench formed by the opener. In certain embodiments, the opener/agricultural product tube may be followed by a packer assembly (e.g., including a packer wheel, etc.) that packs soil on top of the deposited agricultural product.

In certain embodiments, each row unit 30 of the second row 32 is laterally offset (e.g., offset in a direction perpendicular to the direction of travel 18) from a respective row unit 30 of the first row 28, such that two adjacent rows of agricultural product are established within the soil. While the illustrated agricultural implement 10 includes two row units 30 in the first row 28 and two row units 30 in the second row 32 for illustrative purposes, the agricultural implement may have any suitable number of row units in the first row and any suitable number of row units in the second row. For example, the agricultural implement may include 5, 10, 15, 20, 25, or 30 row units in the first row and a corresponding number of row units in the second row. Furthermore, in certain embodiments, the second row may include more or fewer row units than the first row.

In certain embodiments, the agricultural implement and/or at least one row unit of the agricultural implement includes a downforce actuator configured to control a force applied by the opener to the soil. For example, in certain embodiments, the agricultural implement may include multiple downforce actuators, in which each downforce actuator is configured to control the force applied by the openers of a group of row units coupled to the downforce actuator. The downforce actuator may enable the force applied by the respective opener(s) to the soil to be adjusted based on soil conditions, soil type, agricultural product type (e.g., seed type, fertilizer type, etc.), other suitable parameters, or a combination thereof. For example, the downforce applied by the downforce actuator may be reduced for moist soil conditions to reduce the contact force between the respective gauge wheel(s) and the soil surface, thereby reducing compaction, and the downforce applied by the downforce actuator may be increased for harder soil to enable the respective gauge wheel(s) to maintain contact with the soil surface.

As discussed in detail below, the agricultural implement may include a penetration depth control and gauge wheel contact force monitoring system configured to control the penetration depth of the opener of at least one row unit and to monitor the contact force between the gauge wheel of the at least one row unit and the soil surface. In certain embodiments, the penetration depth control and gauge wheel contact force monitoring system includes a penetration depth actuator configured to drive a gauge wheel arm assembly to move the gauge wheel relative to the frame of the row unit to control the penetration depth of the opener of the row unit. The penetration depth actuator includes a contact force sensor configured to output a sensor signal indicative of the contact force between the gauge wheel and the soil surface. In addition, the penetration depth actuator includes a body configured to be coupled to the frame and an actuating device configured to be coupled to the gauge wheel arm assembly. The actuating device is configured to move relative to the body to drive the gauge wheel arm assembly to move the gauge wheel. Furthermore, the penetration depth actuator includes a first connector coupled to the body and configured to couple to an actuating line, and the penetration depth actuator includes a second connector coupled to the body and configured to communicatively couple a sensor line to the contact force sensor. Because the contact force sensor is integrated within the penetration depth actuator, the manufacturing cost and complexity of the row unit may be substantially reduced (e.g., as compared to a row unit that includes a separate contact force sensor, such as a strain gauge coupled to the gauge wheel arm assembly). In certain embodiments, the penetration depth control and gauge wheel contact force monitoring system may include a controller configured to control the respective downforce actuator based on feedback from the contact force sensor.

Furthermore, in certain embodiments, the agricultural implement includes a penetration depth control system (e.g., incorporated within the penetration depth control and gauge wheel contact force monitoring system disclosed above) configured to control the penetration depth of the opener of at least one row unit. The penetration depth control system includes a soil sensor configured to receive a soil signal from the soil indicative of at least one property of the soil and to output a sensor signal indicative of the at least one property. The penetration depth control system also includes a penetration depth actuator (e.g., the penetration depth actuator disclosed above or another suitable penetration depth actuator) configured to drive the gauge wheel arm assembly to move the gauge wheel relative to the frame of the row unit to control the penetration depth of the opener within the soil. Furthermore, the penetration depth control system includes a controller having a memory and a processor. The controller is configured to receive the sensor signal from the soil sensor, to determine a target penetration depth based on the soil property/properties, and to control the penetration depth actuator based on the target penetration depth. Because the controller controls the penetration depth of the opener based on the soil property/properties, the agricultural product (e.g., seed, fertilizer, etc.) may be disposed at a desired depth within the soil throughout the field, thereby enhancing crop development and yield (e.g., as compared to utilizing a fixed penetration depth throughout the field).

Figure 2:
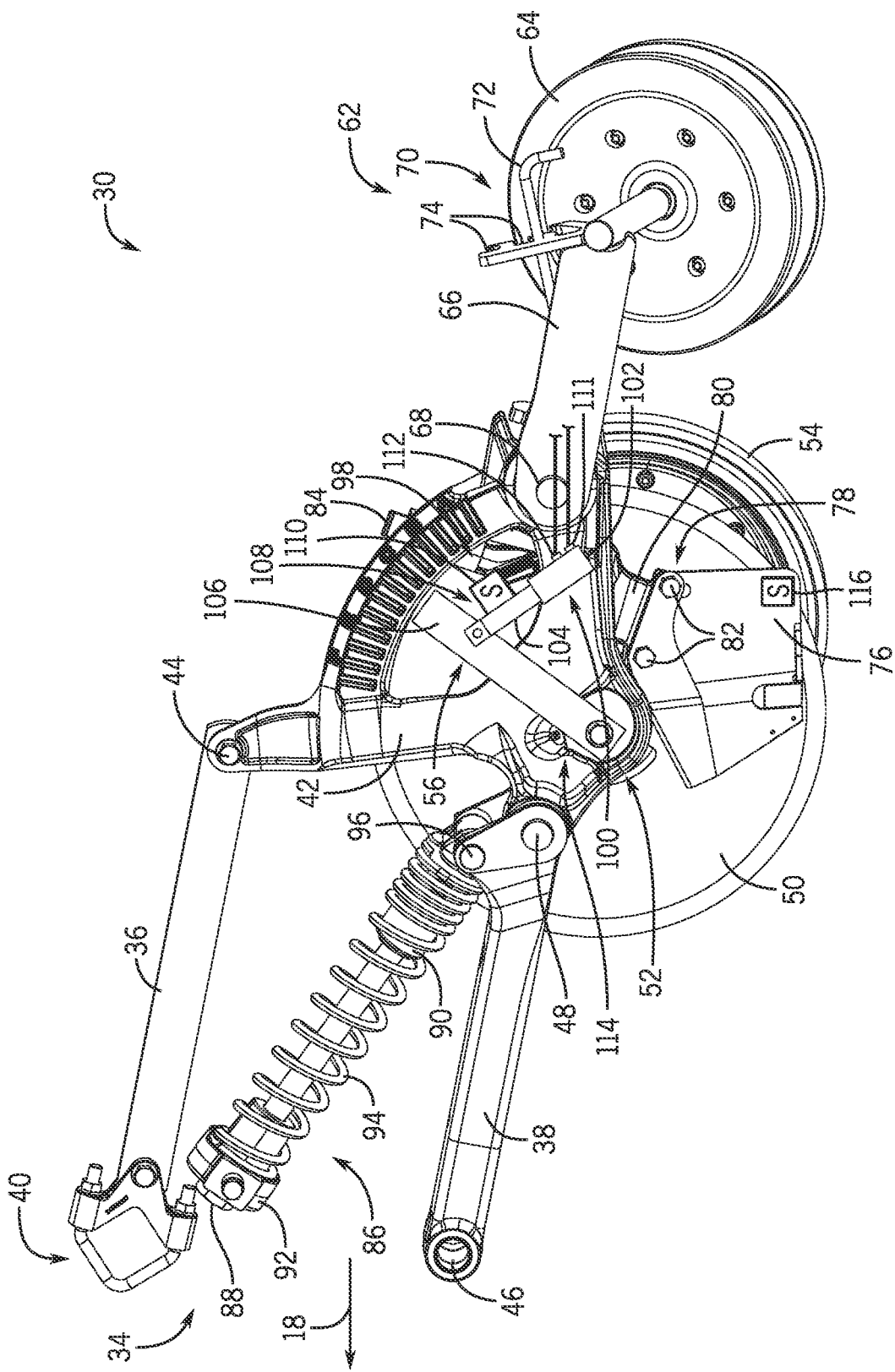
FIG. 2 is a left side view of an embodiment of a row unit that may be employed within the agricultural implement of FIG. 1.

FIG. 2 is a left side view of an embodiment of a row unit 30 (e.g., agricultural row unit) that may be employed within the agricultural implement of FIG. 1. In the illustrated embodiment, the row unit 30 includes a linkage assembly 34 configured to couple the row unit 30 to a respective toolbar of the agricultural implement. The linkage assembly 34 includes an upper link 36 and a lower link 38. A mount 40 is positioned at a first end of the upper link 36 and is configured to couple to the respective toolbar of the agricultural implement. In addition, a second end of the upper link 36 is coupled to a frame 42 of the row unit 30 by a fastener 44. The lower link 38 includes an opening 46 configured to receive a fastener that rotatably couples the lower link 38 to the respective toolbar. In addition, a second end of the lower link 38 is coupled to the frame 42 of the row unit 30 by a fastener 48. The linkage assembly 34 enables the frame 42 of the row unit 30 to move vertically (e.g., raise and lower) relative to the respective toolbar (e.g., in response to obstructions or variations in the terrain, for raising the row unit frame for transport, etc.). While the linkage assembly 34 includes the upper link 36 and the lower link 38 in the illustrated embodiment, in other embodiments, the row unit may include any other suitable linkage/linkage assembly configured to facilitate vertical movement of the row unit frame relative to the respective toolbar. For example, in certain embodiments, the linkage assembly may include non-parallel links.

In the illustrated embodiment, the row unit 30 includes an opener disc 50 rotatably and non-movably coupled to the frame 42 by a bearing assembly 52. The bearing assembly 52 enables the opener disc 50 to freely rotate as the opener disc engages the soil, thereby enabling the opener disc 50 to excavate a trench within the soil. While the row unit 30 includes an opener disc 50 in the illustrated embodiment, in other embodiments, the row unit may include another suitable opener (e.g., shank, point, etc.) configured to excavate a trench within the soil.

In the illustrated embodiment, the row unit 30 includes a gauge wheel 54 configured to control a penetration depth of the opener disc 50 into the soil. The gauge wheel 54 is configured to rotate along the surface of the soil. Accordingly, adjusting the vertical position of the gauge wheel 54 relative to the frame 42 controls the penetration depth of the opener disc 50 into the soil. As discussed in detail below, the gauge wheel 54 is rotatably coupled to a gauge wheel support arm of a gauge wheel arm assembly 56, and the gauge wheel support arm is pivotally coupled to the frame 42. Accordingly, pivoting of the gauge wheel support arm drives the gauge wheel 54 to move vertically relative to the frame 42. In certain embodiments, the gauge wheel 54 is positioned against the opener disc 50 to remove soil from a side of the opener disc 50 during operation of the row unit 30.

In the illustrated embodiment, the row unit 30 includes a packer wheel assembly 62 having a packer wheel 64 and a support arm 66. The support arm 66 is pivotally coupled to the frame 42 by a fastener 68, and the packer wheel 64 is rotatably coupled to the support arm 66. The packer wheel 64 is configured to pack soil on top of the deposited agricultural product (e.g., to facilitate development of the resulting agricultural crop). The force applied by the packer wheel 64 to the soil surface may be adjusted via an adjustment assembly 70. The adjustment assembly 70 includes a torsion spring 72 configured to urge the support arm 66/packer wheel 64 toward the soil surface. An end of the torsion spring 72 may be moved between notches 74 to control the force applied by the packer wheel 64 to the soil surface. While the row unit includes the packer wheel assembly 62 in the illustrated embodiment, in other embodiments, the packer wheel assembly may be omitted.

In the illustrated embodiment, the row unit 30 includes a scraper 76 disposed adjacent to the opener disc 50 and configured to remove accumulated soil from the opener disc 50. As illustrated, a mounting portion 78 of the scraper 76 is rigidly coupled to a mounting bracket 80 by fasteners 82. In alternative embodiments, the scraper may be coupled directly to the frame, or the scraper may be mounted to another suitable mounting structure. In the illustrated embodiment, the mounting bracket 80 is pivotally coupled to the frame 42 by a shaft, and a biasing member urges the bracket 80/scraper 76 toward the opener disc 50, thereby facilitating debris removal. While the illustrated row unit includes a scraper, in other embodiments, the scraper may be omitted. Furthermore, the row unit 30 includes an agricultural product tube 84 (e.g., seed tube) configured to direct agricultural product into the trench formed by the opener disc 50.

The row unit 30 includes a spring assembly 86 configured to control upward vertical movement of the row unit frame 42 (e.g., in response to contact between the opener disc 50 and an obstruction within the field). In the illustrated embodiment, the spring assembly 86 includes a bolt/tube assembly 88 that connects a lower trunnion 90 to an upper trunnion 92. The bolt/tube assembly 88 and lower trunnion 90 are surrounded by a compression spring 94. In addition, the spring assembly 86 is rotatably coupled to the lower link 38 by a fastener 96 to enable the spring assembly 86 to rotate relative to the lower link 38. In certain embodiments, a downforce actuator is configured to compress the spring assemblies of a group of row units. The force applied by the downforce actuator may be controlled to control the force applied by the opener disc 50 to the soil (e.g., while compressing the spring 94). In addition, the spring 94 is compressed by the downforce actuator, and the spring 94 controls upward vertical movement of the frame 42 in response to the opener disc 50 or the gauge wheel 54 encountering an obstruction (e.g., rock, branch, etc.) within the field. While the spring assembly includes a coil spring in the illustrated embodiment, in other embodiments, the spring assembly may include other suitable type(s) of spring(s) (e.g., alone or in combination with the coil spring), such as a leaf spring, a hydraulic cylinder configured to compress/extend in response to the opener disc/gauge wheel encountering an obstruction, a pneumatic cylinder/air bag configured to compress/extend in response to the opener disc/gauge wheel encountering an obstruction, other suitable type(s) of spring(s), or a combination thereof. Furthermore, while the row unit includes the spring assembly in the illustrated embodiment, in other embodiments, the spring assembly may be omitted. For example, in certain embodiments, the spring assembly may be omitted, and a downforce actuator may extend from the toolbar to the row unit (e.g., to the frame of the row unit, to a link of the linkage assembly, etc.).

In the illustrated embodiment, the agricultural implement (e.g., the row unit 30 of the agricultural implement) includes a penetration depth control and gauge wheel contact force monitoring system 98. The penetration depth control and gauge wheel contact force monitoring system is configured to control the penetration depth of the opener disc 50 and to monitor the contact force between the gauge wheel 54 and the soil surface. In the illustrated embodiment, the penetration depth control and gauge wheel contact force monitoring system 98 includes a penetration depth actuator 100 configured to drive the gauge wheel arm assembly 56 to move the gauge wheel 54 relative to the frame 42 to control the penetration depth of the opener disc 50 within the soil. The penetration depth actuator 100 includes a body 102 coupled to the frame 42 and an actuating device 104 coupled to the gauge wheel arm assembly 56. The actuating device 104 is configured to move relative to the body 102 to drive the gauge wheel arm assembly 56 to move the gauge wheel. Accordingly, the penetration depth actuator 100 is configured to control the vertical position of the gauge wheel 54, thereby controlling the penetration depth of the opener disc 50 within the soil.

In the illustrated embodiment, the actuating device 104 is rotatably coupled to an actuating arm 106 of the gauge wheel arm assembly 56. In addition, the actuating arm 106 is non-rotatably coupled to the gauge wheel support arm of the gauge wheel arm assembly 56. The actuating arm 106 is configured to drive the gauge wheel support arm to rotate about a pivot point, thereby controlling the vertical position of the gauge wheel 54 relative to the frame 42/opener disc 50. Accordingly, the actuating device 104 of the penetration depth actuator 100 may be moved relative to the body 102 of the penetration depth actuator 100 to drive the actuating arm 106 and the gauge wheel support arm to rotate, thereby controlling the vertical position of the gauge wheel 54 relative to the frame 42. While the actuating device 104 is rotatably coupled to the actuating arm 106 in the illustrated embodiment, in other embodiments, the actuating device may be non-rotatably coupled to the actuating arm. Furthermore, in certain embodiments, the actuating device of the penetration depth actuator may be coupled to another suitable component of the gauge wheel arm assembly, such as the gauge wheel support arm. In such embodiments, the actuating arm may be omitted (e.g., the gauge wheel arm assembly may include another suitable component coupled to the actuating device). In addition, while the body 102 is coupled to the frame 42 and the actuating device 104 is coupled to the gauge wheel arm assembly 56 in the illustrated embodiment, in other embodiments, the body may be coupled to the gauge wheel arm assembly, and the actuating device may be coupled to the frame.

The penetration depth actuator 100 may include any suitable device configured to drive the gauge wheel arm assembly 56 to move the gauge wheel 54 relative to the frame 42 of the row unit 30. For example, in certain embodiments, the penetration depth actuator includes a pneumatic or hydraulic actuator (e.g., pneumatic cylinder, hydraulic cylinder, airbag, pneumatic motor, hydraulic motor, etc.). Furthermore, in certain embodiments, the penetration depth actuator includes an electromechanical actuator (e.g., electric screw drive, electric linear actuator, electric motor, etc.). In certain embodiments, the penetration depth actuator includes a pneumatic or hydraulic cylinder. In such embodiments, the actuating device of the penetration depth actuator may correspond to the piston rod of the pneumatic/hydraulic cylinder, and the body of the penetration depth actuator may correspond to the cylinder of the pneumatic/hydraulic cylinder. Furthermore, in certain embodiments, the penetration depth actuator includes a mechanical linkage (e.g., a screw drive assembly, a rack and pinion assembly, etc.) configured to convert rotary movement (e.g., from an electric motor, a pneumatic motor, a hydraulic motor, etc.) into linear movement. In such embodiments, the actuating device of the penetration depth actuator may correspond to an element of the mechanical linkage (e.g., the screw of the screw drive assembly, the rack of the rack and pinion assembly, etc.), and the body of the penetration depth actuator may correspond to the body of the motor. While the penetration depth actuator 100 is a linear actuator in the illustrated embodiment, in other embodiments, the penetration depth actuator may be a rotary actuator (e.g., including a pneumatic motor, a hydraulic motor, an electric motor, etc.). In such embodiments, the actuating device is configured to rotate relative to the body of the penetration depth actuator to drive the gauge wheel arm assembly to move the gauge wheel. For example, in certain embodiments, the actuating device (e.g., output shaft) may be non-rotatably coupled to the gauge wheel support arm, or the actuating device (e.g., output shaft) may be non-rotatably coupled to another suitable component of the gauge wheel arm assembly.

In the illustrated embodiment, the penetration depth actuator includes a contact force sensor 108 configured to output a sensor signal indicative of a contact force between the gauge wheel 54 and the soil surface. The contact force between the gauge wheel 54 and the soil surface urges the gauge wheel support arm to rotate about the pivot point. Due to the non-rotatable coupling between the gauge wheel support arm and the actuating arm 106, the contact force urges the actuating arm 106 to rotate. However, rotation of the actuating arm 106 is blocked by the penetration depth actuator 100. Accordingly, the contact force causes a force to be applied to the penetration depth actuator 100. The contact force sensor 108 is configured to monitor the force applied to the penetration depth actuator 100, thereby monitoring the contact force between the gauge wheel 54 and the soil surface. Because the contact force sensor 108 is integrated within the penetration depth actuator 100, the manufacturing cost and complexity of the row unit 30 may be substantially reduced (e.g., as compared to a row unit that includes a separate contact force sensor, such as a strain gauge coupled to the gauge wheel arm assembly).

In the illustrated embodiment, the contact force sensor 108 includes a strain gauge 110 coupled to the actuating device 104 and configured to monitor compression of the actuating device 104. However, in other embodiments, the contact force sensor may include other and/or additional force sensing device(s). For example, in certain embodiments, the contact force sensor may include a strain gauge coupled to the body of the penetration depth actuator. In addition, in certain embodiments, the contact force sensor may include a load cell coupled to the body and/or the actuating device of the penetration depth actuator. Furthermore, in embodiments in which the penetration depth actuator includes a rotary actuator, the contact force sensor may include a torque monitoring device (e.g., a strain gauge coupled to the actuating device and configured to monitor torque on the actuating device, a torque sensor coupled to the actuating device and/or the body, etc.). In addition, in embodiments in which the penetration depth actuator includes an electromechanical actuator, the contact force sensor may include an electrical current sensor configured to monitor the electrical current applied to the electromechanical actuator.

In the illustrated embodiment, the penetration depth actuator 100 includes a first connector 111 coupled to the body 102 and configured to couple to an actuating line. The actuating line is configured to enable remote control of the penetration depth actuator 100, and the type of actuating line corresponds to the type of actuator. For example, as previously discussed, in certain embodiments, the penetration depth actuator may include an electromechanical actuator. In such embodiments, the actuating line includes an electrical line. Furthermore, in certain embodiments, the penetration depth actuator may include a hydraulic actuator, and the actuating line may include a hydraulic line. In addition, in certain embodiments, the penetration depth actuator may include a pneumatic actuator, and the actuating line may include a pneumatic line.

Furthermore, in the illustrated embodiment, the penetration depth actuator 100 includes a second connector 112 coupled to the body 102 and configured to communicatively couple a sensor line to the contact force sensor 108. For example, in certain embodiments, the penetration depth actuator may include one or more electrical conductors extending between the contact force sensor and the second connector. In addition, the second connector may include any suitable interface configured to couple to the sensor line. As discussed in detail below, the sensor line is configured to communicatively couple the contact force sensor to a controller.

In the illustrated embodiment, the agricultural implement (e.g., the row unit 30 of the agricultural implement) includes a penetration depth control system 114 (e.g., incorporated within the penetration depth control and gauge wheel contact force monitoring system 98) configured to control the penetration depth of the opener disc 50. The penetration depth control system 114 includes a soil sensor 116 configured to receive a soil signal from the soil indicative of at least one property of the soil and to output a sensor signal indicative of the soil property/properties. In certain embodiments, the soil sensor includes a passive sensor configured to receive the soil signal from the soil without emitting an input signal into the soil. For example, the passive sensor may include an optical sensor (e.g., camera) or an infrared sensor configured to receive an electromagnetic frequency soil signal from the soil. Furthermore, in certain embodiments, the soil sensor may include an active sensor configured to emit an input signal into the soil. In such embodiments, the soil signal corresponds to a return signal from the soil. For example, the active sensor may include an electrical conductivity sensor configured to emit and receive electrical signals, an electrostatic sensor configured to emit and receive electrical field signals, a radio frequency transducer configured to emit and receive radio frequency signals, an infrared transducer configured to emit and receive infrared signals, an optical sensor (e.g., LIDAR sensor, etc.) configured to emit and receive optical signals, or a RADAR sensor configured to emit and receive electromagnetic frequency signals. Furthermore, in certain embodiments, the soil sensor may include multiple sensors of the same type or of different types (e.g., one or more active sensors and/or one or more passive sensors). The soil sensor 116 may be configured to monitor any suitable soil property/properties, such as soil moisture content, soil composition/texture, organic matter content, pH, soil firmness/compaction, soil density, or a combination thereof.

In the illustrated embodiment, the soil sensor 116 is coupled to the scraper 76. However, in other embodiments, the soil sensor may be coupled to any other suitable portion of the row unit. For example, in certain embodiments, the soil sensor may be coupled to the frame, to the packer wheel support arm, or to the linkage assembly. In addition, in certain embodiments, the row unit may include a double-shoot knife attachment positioned behind the scraper and configured to receive agricultural product from the agricultural product tube or from multiple agricultural product tubes. In such embodiments, the soil sensor may be coupled to the double-shoot knife attachment. Furthermore, in certain embodiments, multiple sensors of the soil sensor may be located in multiple positions throughout the row unit.

In certain embodiments, the penetration depth control system includes a controller having a memory and a processor. In such embodiments, the controller is configured to receive the sensor signal from the soil sensor, to determine a target penetration depth of the opener disc within the soil based on the soil property/properties, and to control the penetration depth actuator based on the target penetration depth. For example, the controller may control the penetration depth such that a difference between the target penetration depth and a determined penetration depth is less than a threshold value. Because the controller controls the penetration depth of the opener disc based on the soil property/properties, the agricultural product (e.g., seed, fertilizer, etc.) may be disposed at a desired depth within the soil throughout the field, thereby enhancing crop development and yield (e.g., as compared to utilizing a fixed penetration depth throughout the field).

In the illustrated embodiment, the row unit 30 is a seeding/seeder row unit, as compared to a planting/planter row unit. Accordingly, a storage compartment (e.g., hopper, mini-hopper, etc.) for agricultural product is not non-movably coupled to the frame 42 (e.g., as compared to a planting/planter row unit that includes an agricultural product storage compartment, such as a hopper or a mini-hopper configured to receive agricultural product from a central storage compartment, non-movably coupled to the frame). In addition, the seeding/seeder row unit 30 includes a single opener disc 50 (e.g., as compared to a planting/planter row unit that includes a pair of opener discs arranged to form a v-shaped trench). Furthermore, in the illustrated embodiment, a metering device is not non-movably coupled to the frame of the row unit (e.g., as compared to a planting/planter row unit that includes a frame-mounted metering device, such as a vacuum seed meter). However, in other embodiments, a metering device (e.g., seed meter) may be non-movably coupled to the frame of the row unit.

Figure 3:
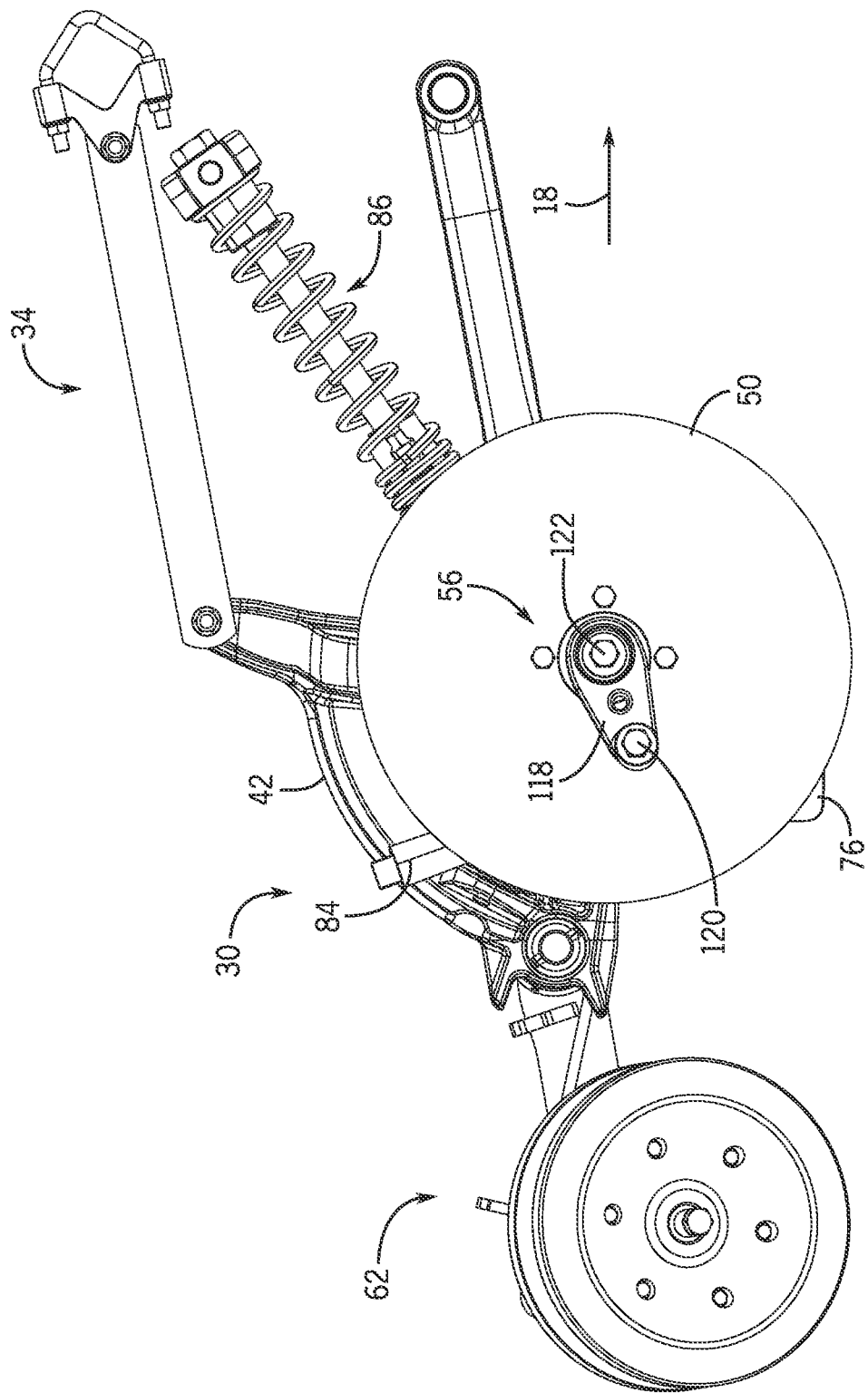
FIG. 3 is a right side view of a portion of the row unit of FIG. 2.

FIG. 3 is a right side view of a portion of the row unit 30 of FIG. 2. As previously discussed, the gauge wheel engages the surface of the soil and controls the penetration depth of the opener disc 50 into the soil. The gauge wheel is configured to be rotatably coupled to the gauge wheel support arm 118 of the gauge wheel arm assembly 56 and to rotate about a rotation axis 120. In addition, the gauge wheel support arm 118 is pivotally coupled to the frame 42 and configured to pivot relative to the frame 42 about a pivot point 122, thereby pivotally coupling the gauge wheel to the frame. As previously discussed, the gauge wheel support arm 118 is non-rotatably coupled to the actuating arm. As a result, the penetration depth actuator may drive the gauge wheel support arm 118 to rotate about the pivot point 122, thereby controlling the vertical position of the rotation axis 120 of the gauge wheel, which controls the penetration depth of the opener disc 50 into the soil.

Figure 4:
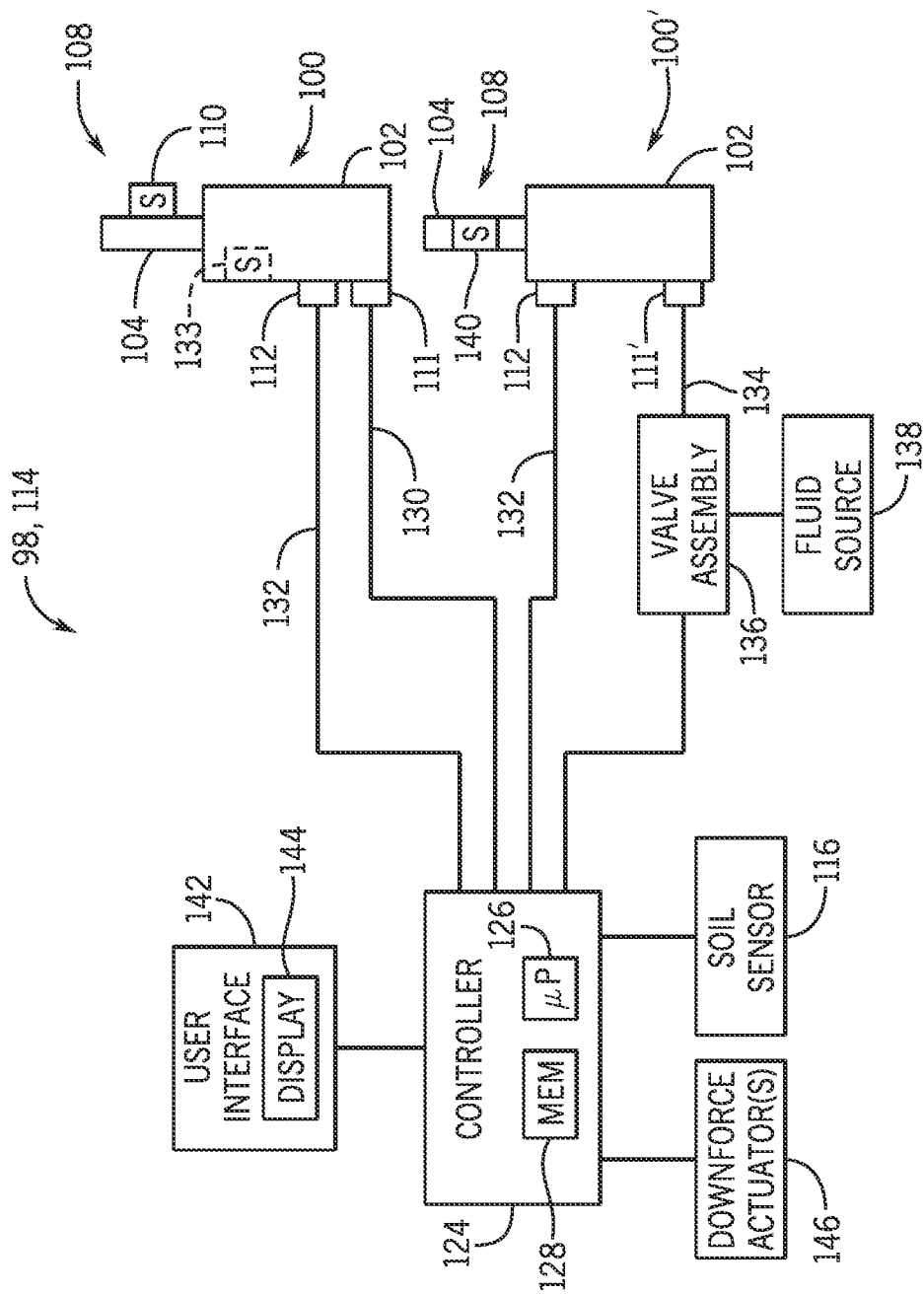
FIG. 4 is a schematic view of an embodiment of a penetration depth control and gauge wheel contact force monitoring system/penetration depth control system that may be utilized with the row unit of FIG. 2.

FIG. 4 is a schematic view of an embodiment of a penetration depth control and gauge wheel contact force monitoring system 98/penetration depth control system 114 that may be utilized with the row unit of FIG. 2. In the illustrated embodiment, the penetration depth control and gauge wheel contact force monitoring system 98/penetration depth control system 114 includes a controller 124 communicatively coupled to the penetration depth actuator 100 and to the soil sensor 116. In certain embodiments, the controller 124 is an electronic controller having electrical circuitry configured to receive the sensor signal from the soil sensor 116 and to output a control signal to the penetration depth actuator 100. In the illustrated embodiment, the controller 124 includes a processor, such as the illustrated microprocessor 126, and a memory device 128. The controller 124 may also include one or more storage devices and/or other suitable components. The processor 126 may be used to execute software, such as software for controlling the penetration depth actuator 100, and so forth. Moreover, the processor 126 may include multiple microprocessors, one or more "general-purpose" microprocessors, one or more special-purpose microprocessors, and/or one or more application specific integrated circuits (ASICS), or some combination thereof. For example, the processor 126 may include one or more reduced instruction set (RISC) processors.

The memory device 128 may include a volatile memory, such as random access memory (RAM), and/or a nonvolatile memory, such as read-only memory (ROM). The memory device 128 may store a variety of information and may be used for various purposes. For example, the memory device 128 may store processor-executable instructions (e.g., firmware or software) for the processor 126 to execute, such as instructions for controlling the penetration depth actuator 100, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the penetration depth actuator, etc.), and any other suitable data.

As previously discussed, the penetration depth actuator 100 includes a body 102 configured to couple to the frame of the row unit, and the penetration depth actuator 100 includes an actuating device 104 configured to couple to the gauge wheel arm assembly. The actuating device 104 is configured to move relative to the body 102 to drive the gauge wheel arm assembly to move the gauge wheel. Accordingly, the penetration depth actuator 100 is configured to control the vertical position of the gauge wheel, thereby controlling the penetration depth of the opener disc within the soil. Furthermore, as previously discussed, the penetration depth actuator 100 may include any suitable device configured to drive the gauge wheel arm assembly to move the gauge wheel (e.g., a pneumatic actuator, a hydraulic actuator, an electromechanical actuator, etc.). In addition, the penetration depth actuator 100 may be a linear actuator or a rotary actuator.

Furthermore, the penetration depth actuator 100 includes a contact force sensor 108 configured to output a sensor signal (e.g., contact force signal) indicative of a contact force between the gauge wheel and the soil surface. In the illustrated embodiment, the contact force sensor 108 includes a strain gauge 110 coupled to the actuating device 104 and configured to monitor compression of the actuating device 104. In other embodiments, the contact force sensor may include a strain gauge coupled to the body and configured to monitor compression of the body. Furthermore, in certain embodiments, the contact force sensor may include a load cell coupled to the body and/or the actuating device of the penetration depth actuator. In addition, in embodiments in which the penetration depth actuator includes an electromechanical actuator, the contact force sensor may include an electrical current sensor configured to monitor the electrical current applied to the electromechanical actuator.

In the illustrated embodiment, the penetration depth actuator 100 includes a first connector 111 coupled to the body 102 and configured to couple to an actuating line. The actuating line is configured to enable remote control of the penetration depth actuator 100. In the illustrated embodiment, the penetration depth actuator 100 includes an electromechanical actuator. Accordingly, the actuating line includes an electrical line 130. As illustrated, the electrical line is communicatively coupled to the controller 124. Accordingly, the controller 124 is configured to control the penetration depth actuator 100 via the electrical line 130. While the actuating line includes a single electrical line 130 in the illustrated embodiment, in other embodiments, the actuating line may include multiple electrical lines (e.g., 2, 3, 4, 5, 6, or more). Furthermore, the first connector 111 may include any suitable type of electrical connector configured to couple the electrical line(s) to the body, thereby enabling the controller 124 to control the penetration depth actuator 100. In addition, in certain embodiments, the penetration depth actuator 100 may include multiple first connectors 111, and at least one electrical line may be coupled to the body via each first connector 111.

Furthermore, in the illustrated embodiment, the penetration depth actuator 100 includes a second connector 112 coupled to the body 102 and configured to communicatively couple a sensor line 132 to the contact force sensor 108. As previously discussed, the penetration depth actuator may include one or more electrical conductors extending between the contact force sensor and the second connector. Furthermore, as previously discussed, the second connector may include any suitable interface configured to couple to the sensor line 132. As illustrated, the sensor line 132 is communicatively coupled to the controller 124. The controller 124 is configured to receive the sensor signal and to determine the contact force between the gauge wheel and the soil surface based on the sensor signal.

While the contact force sensor 108 includes a strain gauge 110 in the illustrated embodiment, in other embodiments, the contact force sensor may include an electrical current sensor 133 (e.g., alone or in combination with the strain gauge 110) configured to monitor the electrical current applied to the electromechanical actuator. In such embodiments, the controller may determine the contact force between the gauge wheel and the soil surface based on the electrical current applied to the electromechanical actuator. For example, the controller may store a relationship between electrical current and contact force (e.g., table, empirical formula, chart, graph, etc.), and utilize the stored relationship to determine the contact force based on the electrical current.

In the illustrated embodiment, the penetration depth control and gauge wheel contact force monitoring system 98/penetration depth control system 114 includes a second penetration depth actuator 100'. The second penetration depth actuator 100' may be coupled to another row unit of the agricultural implement. The second penetration depth actuator 100' includes a pneumatic or hydraulic actuator (e.g., pneumatic cylinder, pneumatic motor, hydraulic cylinder, hydraulic motor, airbag, etc.). Accordingly, the actuating line includes a fluid line 134 (e.g., hydraulic line or pneumatic line). For example, in embodiments in which the pneumatic/hydraulic actuator is a pneumatic actuator, the actuating line may include a pneumatic line, and in embodiments in which the pneumatic/hydraulic actuator is a hydraulic actuator, the actuating line may include a hydraulic line.

In the illustrated embodiment, the penetration depth control and gauge wheel contact force monitoring system 98/penetration depth control system 114 includes a valve assembly 136 configured to control fluid flow to/from the pneumatic/hydraulic actuator to control the position of the gauge wheel. For example, the valve assembly 136 may control fluid flow from a fluid source 138 (e.g., hydraulic fluid reservoir, air tank, etc.) to the pneumatic/hydraulic actuator, and/or the valve assembly 136 may control fluid flow from the pneumatic/hydraulic actuator to the fluid source 138 (e.g., hydraulic fluid reservoir, etc.). The valve assembly 136 is communicatively coupled to the controller 124, and the controller 124 is configured to control the penetration depth actuator 100' via the valve assembly 136. Accordingly, the controller 124 is communicatively coupled to the penetration depth actuator 100' via the valve assembly 136 and the fluid line 134. While the actuating line includes a single fluid line 134 in the illustrated embodiment, in other embodiments, the actuating line may include multiple fluid lines (e.g., 2, 3, 4, 5, 6, or more). Furthermore, the first connector 111' may include any suitable type of pneumatic/hydraulic connector configured to couple the fluid line(s) to the body, thereby enabling the controller 124 to control the penetration depth actuator 100'. In addition, in certain embodiments, the penetration depth actuator 100' may include multiple first connectors 111', and at least one fluid line may be coupled to the body via each first connector 111'.

In the illustrated embodiment, the contact force sensor 108 includes a load cell 140 coupled to the actuating device 104. The load cell 140 (e.g., piezoelectric load cell, etc.) is configured to output the sensor signal indicative of the force applied by the gauge wheel to the soil surface. While the load cell 140 is coupled to the actuating device 104 in the illustrated embodiment, in other embodiments, the load cell may be coupled to the body of the penetration depth actuator, or the load cell may be coupled to the actuating device and the body of the penetration depth actuator. While the contact force sensor 108 includes the load cell 140 in the illustrated embodiment, in other embodiments, the contact force sensor may include a strain gauge (e.g., coupled to the actuating device or the body). While each penetration depth actuator includes a single contact force sensor in the illustrated embodiment, in other embodiments, the penetration depth actuator may include multiple contact force sensors (e.g., of the same type or of different types).

While the penetration depth control and gauge wheel contact force monitoring system 98/penetration depth control system 114 includes two penetration depth actuators in the illustrated embodiment, in other embodiments, the penetration depth control and gauge wheel contact force monitoring system/penetration depth control system may include more or fewer penetration depth actuators (e.g., 1, 3, 4, 5, 6, or more). For example, in certain embodiments, the penetration depth control and gauge wheel contact force monitoring system/penetration depth control system may include one penetration depth actuator for each row unit. Furthermore, while the penetration depth control and gauge wheel contact force monitoring system 98/penetration depth control system 114 includes different types of penetration depth actuators in the illustrated embodiment, in other embodiments, the penetration depth control and gauge wheel contact force monitoring system/penetration depth control system may include a single type of penetration depth actuator (e.g., only hydraulic actuators, only pneumatic actuators, only electromechanical actuators, etc.).

In the illustrated embodiment, the penetration depth control and gauge wheel contact force monitoring system 98/penetration depth control system 114 includes a user interface 142 communicatively coupled to the controller 124. The user interface 142 is configured to receive input from an operator and, in certain embodiments, to provide information to the operator. The user interface 142 may include any suitable input device(s) for receiving input, such as a keyboard, a mouse, button(s), switch(es), knob(s), other suitable input device(s), or a combination thereof. In addition, the user interface 142 may include any suitable output device(s) for presenting information to the operator, such as a speaker, indicator light(s), other suitable output device(s), or a combination thereof. In the illustrated embodiment, the user interface 142 includes a display 144 configured to present visual information to the operator. In certain embodiments, the display 144 may include a touchscreen interface configured to receive input from the operator.

In certain embodiments, the user interface 142 is configured to receive input(s) from the operator (e.g., via the touch screen interface of the display 144) indicative of target penetration depth(s) of the opener disc(s) within the soil. For example, in certain embodiments, the user interface 142 may receive a single input from the operator indicative of a single target penetration depth for the opener disc of each row unit of the agricultural implement. Furthermore, in certain embodiments, the user interface 142 may receive multiple inputs from the operator indicative of multiple target penetration depths for the opener discs of the row units of the agricultural implement (e.g., a target penetration depth for the opener disc of each row unit, a target penetration depth for the opener discs of each group/rank of row units, etc.). In response to receiving the input(s) indicative of the target penetration depth(s), the user interface 144 may output input signal(s) to the controller 124 based on the operator input(s). The controller 124 may then control the penetration depth actuator(s) based on the input signal(s). Furthermore, in certain embodiments, the user interface may receive target penetration depth range(s), and the controller may control the penetration depth(s) based on the target penetration depth range(s).

Furthermore, in certain embodiments, the controller 124 may determine the target penetration depth(s) of the opener disc(s) (e.g., without direct operator input). As previously discussed, the penetration depth control and gauge wheel contact force monitoring system 98/penetration depth control system 114 includes a soil sensor 116 configured to receive a soil signal from the soil indicative of at least one property of the soil and to output a sensor signal indicative of the soil property/properties. The soil sensor 116 is communicatively coupled to the controller 124, and the controller 124 is configured to receive the sensor signal from the soil sensor 116. In addition, the controller 124 is configured to determine a target penetration depth based on the soil property/properties and to control respective penetration depth actuator(s) based on the target penetration depth.

In certain embodiments, the controller 124 may utilize feedback from a single soil sensor 116 to determine a single target penetration depth for the opener disc of each row unit of the agricultural implement. For example, the soil sensor 116 may be mounted to a single row unit (e.g., to the scraper of the single row unit, etc.), and the controller may determine a single target penetration depth based on the sensor signal from the single soil sensor. The controller may then control the penetration depth actuator of each row unit based on the single target penetration depth. Furthermore, in certain embodiments, the penetration depth control and gauge wheel contact force monitoring system/penetration depth control system may include multiple soil sensors, such as one soil sensor for each row unit, one soil sensor for each group/rank of row units, multiple soil sensors for at least one row unit (e.g., at different depths), etc. In such embodiments, the controller may receive the sensor signal from each soil sensor, determine target penetration depths (e.g., for each row unit, for each group/rank of row units, etc.), and control the respective penetration depth actuators based on the target penetration depths.

Furthermore, in certain embodiments, the controller 124 is configured to determine the target penetration depth(s) based on the soil property/properties and data from a soil property map. The soil property map may include a map of soil conditions within the field, a map of yield data within the field, a map of soil types within the field, a map of other suitable soil property parameter(s) (e.g., including steepness of slopes of the field, etc.), or a combination thereof. In addition, the soil property map may be generated by data from an aerial vehicle (e.g., drone), a tillage tool, a harvester, a soil sampling and analysis process, other suitable source(s), or a combination thereof. The soil property map may be stored within the controller 124 and/or received from an external source (e.g., remote server, handheld device, etc.). In response to determining the target penetration depth(s) based on the soil property/properties and the data from the soil property map, the controller 124 may control the penetration depth actuator(s) based on the target penetration depth(s).

In certain embodiments, the controller may not determine the contact force between a respective gauge wheel and the soil surface while the position of the respective gauge wheel is being adjusted to control the penetration depth of the respective opener. Furthermore, in certain embodiments, the soil sensor may be omitted (e.g., the target penetration depth(s) may be received via user input(s), the target penetration depth(s) may be determined based on the soil property map alone, etc.). In addition, in certain embodiments, the controller may adjust each target penetration depth based on minimum and/or maximum penetration depth(s) (e.g., input via the user interface, determined based on feedback from the soil sensor(s), determined based on the soil property map, etc.). For example, if a determined target penetration depth is greater than the maximum penetration depth (e.g., the maximum penetration depth for the respective opener disc), the controller may reduce the target penetration depth to the maximum penetration depth, and/or if a determined target penetration depth is less than the minimum penetration depth (e.g., the minimum penetration depth for the respective opener disc), the controller may increase the target penetration depth to the minimum penetration depth.

In certain embodiments, the controller 124 may control penetration depth(s) such that a difference between the target penetration depth for a respective opener disc and a determined penetration depth for the respective opener disc is less than a threshold value. The controller may determine the determined penetration depth for each respective opener disc based on feedback from a respective penetration depth sensor. For example, in certain embodiments, the penetration depth actuator may include an integrated penetration depth sensor. The integrated penetration depth sensor may include a Hall effect sensor, a linear variable differential transformer (LVDT), an infrared sensor, a linear potentiometer, a rotary potentiometer, an inductive sensor, an ultrasonic sensor, other suitable type(s) of sensor(s), or a combination thereof. The integrated penetration depth sensor may output a signal indicative of the position of the actuating device relative to the body of the penetration depth actuator (e.g., linear position for a linear actuator, angular position for a rotary actuator). The controller may determine the penetration depth based on the position of the actuating device relative to the body (e.g., in combination with gauge wheel arm assembly geometry data, gauge wheel diameter data, a penetration depth/actuating device calibration, etc.). Furthermore, in certain embodiments, the penetration depth sensor may be separate from the penetration depth actuator. For example, the penetration depth sensor may be coupled to the frame of the row unit and configured to monitor an orientation of the gauge wheel support arm.

Furthermore, in certain embodiments, the penetration depth sensor may be mounted to the frame of the row unit and configured to monitor the distance between the row unit frame and the soil surface. In such embodiments, the penetration depth sensor may include a contact sensor. For example, the contact sensor may include an arm extending from the row unit frame and configured to contact the soil surface. The contact sensor may also include an angle sensor (e.g., a potentiometer coupled to the row unit frame and to the arm) configured to monitor the angle of the arm. Additionally or alternatively, the penetration depth sensor may include a non-contact sensor, such as a proximity sensor, an ultrasonic sensor, or an infrared sensor, configured to monitor the distance between the row unit frame and the soil surface.

Furthermore, in certain embodiments, the penetration depth sensor(s) may be omitted. In such embodiments, the controller may utilize open-loop control to control each penetration depth actuator based on the respective target penetration depth. For example, the controller may determine a target position of the actuating device relative to the body of the penetration depth actuator based on the respective target penetration depth (e.g., in combination with gauge wheel arm assembly geometry data, gauge wheel diameter data, a penetration depth/actuating device calibration, etc.). The controller may then instruct the penetration depth actuator to move the actuating device to the target position. In certain embodiments, penetration depth sensor(s) may be utilized to control the penetration depth(s) of certain opener disc(s), and the penetration depth(s) of other opener disc(s) may be controlled utilizing open-loop control.

As previously discussed, the controller 124 is configured to determine the contact force between each gauge wheel and the soil surface. In response to determining the contact force(s), the controller 124 may output one or more output signals to the user interface 142 indicative of the determined contact force(s). Upon receipt of the output signal(s) from the controller 124, the user interface 142 may present graphic and/or numerical representation(s) of the determined contact force(s) on the display 144. Accordingly, an operator may identify the contact force(s) by viewing the display 144. Furthermore, in certain embodiments, the controller may determine the determined penetration depth for each respective opener disc based on feedback from a respective penetration depth sensor. In such embodiments, the controller 124 may output one or more output signals to the user interface 142 indicative of the determined penetration depth(s). Upon receipt of the output signal(s) from the controller 124, the user interface 142 may present graphic and/or numerical representation(s) of the determined penetration depth(s) on the display 144. Accordingly, the operator may identify the penetration depth(s) by viewing the display 144. While the penetration depth control and gauge wheel contact force monitoring system 98/penetration depth control system 114 includes the user interface 142 in the illustrated embodiment, in other embodiments, the user interface may be omitted. Additionally or alternatively, in certain embodiments, the penetration depth control and gauge wheel contact force monitoring system/penetration depth control system may include an interface assembly (e.g., including a wired interface, a wireless interface, etc.) configured to output the determined penetration depth(s) and/or the determined contact force(s) to a remote system and/or to receive target penetration depth(s) and/or target downforce(s) from a remote system.

In addition, in response to determining the contact force between each gauge wheel and the soil surface, the controller 104 may output one or more output signals to downforce actuator(s) 146 of the penetration depth control and gauge wheel contact force monitoring system 98/penetration depth control system 114 to control downforce(s) applied by the downforce actuator(s) 146. In the illustrated embodiment, the downforce actuator(s) 146 are communicatively coupled to the controller 124 and configured to control the force(s) applied by the opener disc(s) to the soil. As a result, the downforce actuator(s) 146 controls the resultant contact force between the gauge wheel(s) and the soil surface. For example, in certain embodiments, a downforce actuator may extend from the toolbar of the agricultural implement to the frame/linkage of a respective row unit. Furthermore, in certain embodiments, a downforce actuator may extend from the toolbar to a transverse member coupled to multiple row units (e.g., the spring assemblies of multiple row units). Each downforce actuator may include a hydraulic actuator, a pneumatic actuator, an electromechanical actuator, other suitable type(s) of actuator(s), or a combination thereof. The downforce actuator(s) are configured to urge the opener disc(s) of respective row unit(s) into the soil, thereby urging the respective gauge wheel(s) against the soil surface.

In certain embodiments, the controller 124 is configured to output the output signal(s) to the downforce actuator(s) 146 to control the force(s) applied by the opener disc(s) to the soil based on the determined contact force(s) and/or target downforce(s). The target downforce(s) may be stored within the controller 124 (e.g., within the storage device), determined by the controller 124 (e.g., based on the soil property/properties monitored by the soil sensor(s), based on a soil property map of the field, based on other suitable parameter(s), or a combination thereof), manually input via the user interface 142 (e.g., via the touch screen interface of the display 144), received from a remote system, or a combination thereof. In certain embodiments, the controller 124 may instruct the downforce actuator(s) 146 to apply the target downforce(s). Additionally or alternatively, the controller 124 may instruct the downforce actuator(s) 146 to increase and/or decrease the downforce(s) such that the determined contact force(s) are above zero (e.g., such that the gauge wheel(s) maintain contact with the soil surface) and below a threshold value (e.g., such that the gauge wheel(s) do not undesirably compact the soil).

While the penetration depth control system 114 includes penetration depth actuators with integrated contact force sensors in the illustrated embodiment, in other embodiments, at least one penetration depth actuator (e.g., each penetration depth actuator of the penetration depth control system) may not include an integrated contact force sensor. Furthermore, while each row unit includes an opener disc in the embodiments disclosed herein, in certain embodiments, at least one row unit may include another suitable type of opener. For example, in certain embodiments, at least one row unit may include a shank opener, and the penetration depth of the shank opener may be controlled by a press wheel of the row unit. In such embodiments, the penetration depth actuator (e.g., including the integrated contact force sensor) disclosed above may extend from the frame of the row unit to a press wheel arm, which supports the press wheel. Furthermore, while the penetration depth control and gauge wheel contact force monitoring system 98 is disclosed above with regard to seeder row units, in certain embodiments, the penetration depth control and gauge wheel contact force monitoring system, including the penetration depth actuator(s) with integrated contact force sensor(s), may be utilized with planter row units of a planting implement.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A penetration depth control and gauge wheel contact force monitoring system for an agricultural row unit, comprising:
a penetration depth actuator configured to drive a gauge wheel arm assembly to move a gauge wheel relative to a frame of the agricultural row unit to control a penetration depth of an opener of the agricultural row unit;
wherein the penetration depth actuator comprises a contact force sensor configured to output a sensor signal indicative of a contact force between the gauge wheel and a soil surface, the penetration depth actuator comprises a body configured to be directly coupled to one of the frame or the gauge wheel arm assembly, the penetration depth actuator comprises an actuating device configured to be directly coupled to the other of the frame or the gauge wheel arm assembly, the actuating device is configured to move relative to the body to drive the gauge wheel arm assembly to move the gauge wheel, the penetration depth actuator comprises a first connector coupled to the body and configured to couple to an actuating line, and the penetration depth actuator comprises a second connector coupled to the body and configured to communicatively couple a sensor line to the contact force sensor.

2. The penetration depth control and gauge wheel contact force monitoring system of claim 1, wherein the contact force sensor comprises a strain gauge coupled to the body or to the actuating device.

3. The penetration depth control and gauge wheel contact force monitoring system of claim 1, wherein the contact force sensor comprises a load cell coupled to the body, to the actuating device, or a combination thereof.

4. The penetration depth control and gauge wheel contact force monitoring system of claim 1, wherein the penetration depth actuator comprises an electromechanical actuator, and the actuating line comprises an electrical line.

5. The penetration depth control and gauge wheel contact force monitoring system of claim 4, wherein the contact force sensor comprises an electrical current sensor.

6. The penetration depth control and gauge wheel contact force monitoring system of claim 1, wherein the penetration depth actuator comprises a hydraulic actuator, and the actuating line comprises a hydraulic line.

7. The penetration depth control and gauge wheel contact force monitoring system of claim 1, wherein the penetration depth actuator comprises a pneumatic actuator, and the actuating line comprises a pneumatic line.

8. An agricultural implement, comprising:
an agricultural row unit, comprising:
a frame; and
a gauge wheel arm assembly configured to movably couple a gauge wheel of the agricultural row unit to the frame; and
a penetration depth control and gauge wheel contact force monitoring system, comprising:
a penetration depth actuator comprising a body directly coupled to one of the frame or the gauge wheel arm assembly, wherein the penetration depth actuator comprises an actuating device directly coupled to the other of the frame or the gauge wheel arm assembly, and the actuating device is configured to move relative to the body to drive the gauge wheel arm assembly to move the gauge wheel relative to the frame to control a penetration depth of an opener of the agricultural row unit;
wherein the penetration depth actuator comprises a contact force sensor configured to output a sensor signal indicative of a contact force between the gauge wheel and a soil surface, the penetration depth actuator comprises a first connector coupled to the body and configured to couple to an actuating line, and the penetration depth actuator comprises a second connector coupled to the body and configured to communicatively couple a sensor line to the contact force sensor.

9. The agricultural implement of claim 8, wherein the contact force sensor comprises a strain gauge coupled to the body or to the actuating device.

10. The agricultural implement of claim 8, wherein the contact force sensor comprises a load cell coupled to the body, to the actuating device, or a combination thereof.

11. The agricultural implement of claim 8, wherein the penetration depth actuator comprises a hydraulic actuator, and the actuating line comprises a hydraulic line.

12. The agricultural implement of claim 8, wherein the penetration depth actuator comprises an electromechanical actuator, the actuating line comprises an electrical line, and the contact force sensor comprises an electrical current sensor.

13. An agricultural implement comprising:
a seeder row unit, comprising:
a frame configured to be coupled to a toolbar of the agricultural implement, wherein an agricultural product storage compartment is not non-movably coupled to the frame;
a single opener disc rotatably coupled to the frame and configured to engage soil;
a scraper disposed adjacent to the opener disc and configured to remove accumulated soil from the opener disc; and
a gauge wheel arm assembly configured to movably couple a gauge wheel of the seeder row unit to the frame; and
a penetration depth control system, comprising:
a soil sensor coupled to the scraper, wherein the soil sensor is configured to receive a soil signal from soil indicative of at least one property of the soil and to output a sensor signal indicative of the at least one property;
a penetration depth actuator configured to drive the gauge wheel arm assembly to move the gauge wheel relative to the frame to control a penetration depth of the single opener disc within the soil, wherein the penetration depth actuator comprises a contact force sensor configured to output a contact force signal indicative of a contact force between the gauge wheel and a soil surface, the penetration depth actuator comprises a body coupled to one of the frame or the gauge wheel arm assembly, the penetration depth actuator comprises an actuating device coupled to the other of the frame or the gauge wheel arm assembly, the actuating device is configured to move relative to the body to drive the gauge wheel arm assembly to move the gauge wheel, the penetration depth actuator comprises a first connector coupled to the body and configured to couple to an actuating line, and the penetration depth actuator comprises a second connector coupled to the body and configured to communicatively couple a sensor line to the contact force sensor; and
a controller comprising a memory and a processor, wherein the controller is configured to receive the sensor signal from the soil sensor, to determine a target penetration depth based on the at least one property of the soil, and to control the penetration depth actuator based on the target penetration depth.

14. The agricultural implement of claim 13, wherein the contact force sensor comprises a strain gauge coupled to the body or to the actuating device.

15. The agricultural implement of claim 13, wherein the contact force sensor comprises a load cell coupled to the body, to the actuating device, or a combination thereof.

16. The agricultural implement of claim 13, wherein the controller is configured to determine the target penetration depth based on the at least one property of the soil and data from a soil property map.

17. The agricultural implement of claim 13, wherein the controller is configured to:
determine a target downforce based on the at least one property of the soil; and
instruct a downforce actuator to apply the target downforce to urge the single opener disc into the soil.

18. The agricultural implement of claim 13, wherein a metering device is not non-movably coupled to the frame.

19. The agricultural implement of claim 13, wherein the penetration depth actuator comprises a hydraulic actuator, and the actuating line comprises a hydraulic line.

20. The agricultural implement of claim 13, wherein the body is directly coupled to the one of the frame or the gauge wheel arm assembly, and the actuating device is directly coupled to the other of the frame or the gauge wheel arm assembly.

* * * * *